(12) United States Patent
Nakai

(10) Patent No.: US 8,828,598 B2
(45) Date of Patent: Sep. 9, 2014

(54) SEALED-TYPE CELL

(75) Inventor: Toru Nakai, Kiyosu (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/115,776

(22) PCT Filed: Jul. 27, 2011

(86) PCT No.: PCT/JP2011/067096
§ 371 (c)(1),
(2), (4) Date: Nov. 5, 2013

(87) PCT Pub. No.: WO2013/014762
PCT Pub. Date: Jan. 31, 2013

(65) Prior Publication Data
US 2014/0141296 A1 May 22, 2014

(51) Int. Cl.
*H01M 2/02* (2006.01)

(52) U.S. Cl.
USPC ............................ 429/178; 429/179; 429/185

(58) Field of Classification Search
USPC ........... 429/178, 179, 185, 186, 161, 174, 57, 429/61
See application file for complete search history.

(56) References Cited

U.S. PATENT DOCUMENTS

| 4,455,356 A * | 6/1984 | Barrett, Jr. ...................... 429/66 |
| 2005/0278941 A1* | 12/2005 | Hamada et al. ............... 29/623.1 |
| 2009/0038145 A1* | 2/2009 | Kozu et al. .................... 29/623.2 |
| 2010/0167116 A1 | 7/2010 | Okada |

FOREIGN PATENT DOCUMENTS

| JP | 2010-157451 | 7/2010 |
| JP | 2012-238473 | 12/2012 |

* cited by examiner

*Primary Examiner* — Raymond Alejandro
(74) *Attorney, Agent, or Firm* — Finnegan, Henderson, Farabow, Garrett & Dunner, LLP

(57) ABSTRACT

A cell has: a pole terminal placed on outside of a cell case; a deformed terminal fixing the pole terminal to the case by a base surface portion and a protruding portion; an inversion plate attached to the base surface portion and interrupting conduction between the internal terminal and the deformed terminal by inversion deforming away from the internal terminal at least at a portion when the internal pressure of the case increases beyond working pressure; and a shaft member having at least a part of the top portion placed in the protruding portion, and reestablishing conduction between the internal terminal and the deformed terminal after the inversion plate inverted by the top portion being pressed from the outside and thereby being moved inside the protruding section to press the inversion plate inward. A sealed space is provided between the deformed terminal and the inversion plate.

20 Claims, 10 Drawing Sheets

SEALED-TYPE CELL

CROSS-REFERENCE TO RELATED APPLICATIONS

This application is a national phase application of International Application No. PCT/JP2011/067096, filed Jul. 27, 2011, the content of which is incorporated herein by reference.

TECHNICAL FIELD

The present invention relates to a hermetically sealed-type cell or battery ("sealed cell") having a power generating element sealed in a cell case and more particularly to a sealed cell including a CID (Current Interrupt Device) in a cell case.

BACKGROUND ART

When a sealed secondary cell or battery enters an overcharge state for some cause, conventionally, the internal pressure of the cell may rise beyond the range of a normal state. Most of secondary cells therefore have safety valves to avoid the internal pressure from excessively rising. Such a safety valve is made more fragile than other parts so that it is broken to open when the internal pressure exceeds the limit and function as a release port for releasing the gas accumulated in a cell.

Another secondary cell or battery includes a CID that works if an internal pressure is higher than an internal pressure in a normal state but lower than a valve opening pressure of a safety valve (see Patent Document 1, for example). The CID disclosed in this document includes a diaphragm 35 made of a bent metal plate. As the internal pressure of the secondary cell rises due to overcharge or other causes, the diaphragm 35 is pushed up and deformed. Upon deformation, the diaphragm 35 is separated from a connecting metal 34 connected to an electrode plate or sheet, resulting in disconnection between the diaphragm 35 and the connecting metal 34. Accordingly, a current path is interrupted at this site and thus the cell is not charged any further.

RELATED ART DOCUMENTS

Patent Documents

Patent Document 1: JP-A-2010-157451

SUMMARY OF INVENTION

Problems to be Solved by the Invention

At the time when the CID worked, the cell is in an overcharged state. Since the current path is interrupted by action of the CID, this cell will not be further charged. However, there is still no established way to safely handle such a cell remaining in an overcharged state after action of the CID for the purpose of e.g. recycle. In particular, a problem that it is not easy to handle a secondary cell in which a CID worked but a safety valve or vent is unopened. The aforementioned Patent Document does not disclose how to handle a secondary cell after a CID is activated.

The present invention has been made in view of the circumstances to solve the above problems and has a purpose to provide a sealed cell capable of safe and easy scrapping after a CID worked.

Means of Solving the Problems

To achieve the above purpose, one aspect of the invention provides a sealed cell including: a cell case formed with a through hole; a power generating element accommodated in the cell case; an inner terminal placed in the cell case and connected to the power generating element; a pole terminal including a cylindrical portion and a bottom portion provided at one end of the cylindrical portion, the bottom portion being formed with a through hole, the pole terminal being placed on outside of the cell case so that the bottom portion faces the cell case and the through hole of the bottom portion is positioned over the through hole of the cell case; a deformed terminal including a base surface portion placed in the cell case, and a hollow protruding portion extending from inside of the cell case into internal space of the cylindrical portion through the through hole of the cell case and the through hole of the pole terminal, and extending radially more outward than the through holes in the internal space so that the base surface portion and the protruding portion fix the pole terminal to the cell case; an inversion plate attached to the base surface portion of the deformed terminal so that at least a part of the inversion plate contacts with the inner terminal in a normal state and, when internal pressure of the cell case rises beyond working pressure, at least the part of the inversion plate is deformed to invert away from the inner terminal to interrupt conduction between the inner terminal and the deformed terminal; and a shaft member having a top portion at least a part of which is placed in the protruding portion so that, after the inversion plate is inverted, the top portion is pressed from outside and moved within the protruding portion to press the inversion plate inward to allow re-conduction between the inner terminal and the deformed terminal, wherein the deformed terminal and the inversion plate are arranged to provide therebetween hermetically sealed space separately from the internal space of the cell case.

According to the above sealed cell, the deformed terminal fixes the pole terminal to the outside of the cell case. The base strike portion of the deformed terminal is attached with the inversion plate and a part of the inversion plate is in contact with the inner terminal. This inversion plate is a part of a CID and configured to be inverted when the internal pressure of the cell rises, separating from the inner terminal to interrupt conduction between the inner terminal and the deformed terminal. Since the cell includes the shaft member, after the inversion plate is inverted, the inner terminal and the deformed terminal can be brought into conduction with each other again by pushing the top portion of the shaft member from outside. In other words, the inversion plate is pushed inward by the shaft member to be inverted again. When the inversion plate is thus re-inverted and an electric path is formed between a positive terminal and a negative terminal of the cell, so that the cell can be discharged to eliminate an overcharged state. Accordingly, the cell can be safely and easily disposed after the CID is activated.

In the above sealed cell, preferably, the shaft member is made of electrically conductive material. With this configuration, the inner terminal and the deformed terminal can be connected to each other through the shaft member. Accordingly, even if the inversion plate is hard to invert again for example due to breakage or the like of the inversion plate, the inner terminal and the deformed terminal can be made conductive again.

In the above sealed cell, preferably, the shaft member is formed with a flange extending radially from an end of the shaft member on an internal side of the cell case. With this configuration, when the top portion is pushed for re-conduction, the inversion plate is pushed inward by the flange of the shaft member. The flange extending radially outward can reliably press against the inversion plate.

In the above sealed cell, preferably, the base surface portion of the deformed terminal includes a side surface portion protruding toward the internal side of the cell case, and the inversion plate is fixed over entire circumference to an end of the side surface portion. With this configuration, the inversion plate can be inverted into space inside the side surface.

In the above sealed cell, preferably, the inner terminal has a through hole, and before inversion of the inversion plate, at least a part of the inversion plate is placed to block the through hole. With this configuration, the internal pressure of the cell case reliably acts on the inversion plate through the through hole.

In the above sealed cell, preferably, a contact portion of the inversion plate and a contact portion of the inner terminal are fixed to each other, and a part of the inner terminal is formed with a fragile portion that is broken when the inversion plate is inverted to separate the contact portion of the inner terminal contacting with the inversion plate from a remaining portion. With this configuration, before inversion of the inversion plate is caused, the inversion plate and the inner terminal are in reliable connection with each other. If the fragile portion is broken by the inversion, the contact portion of the inner terminal contacting with the inversion plate is separated from the remaining portion. If the inner terminal is connected to the power generating element of the cell through the remaining portion, energization of the cell is stopped by breakage of the fragile portion.

Effects of the Invention

According to the sealed cell configured as above of the present invention, the cell in which a CID has worked can be safely and easily scrapped.

MODE FOR CARRYING OUT THE INVENTION

A detailed description of a preferred embodiment of the present invention will now be given referring to the accompanying drawings. In the present embodiment, the invention is applied to a sealed secondary cell or battery such as a lithium ion secondary cell or battery.

Figure 1:
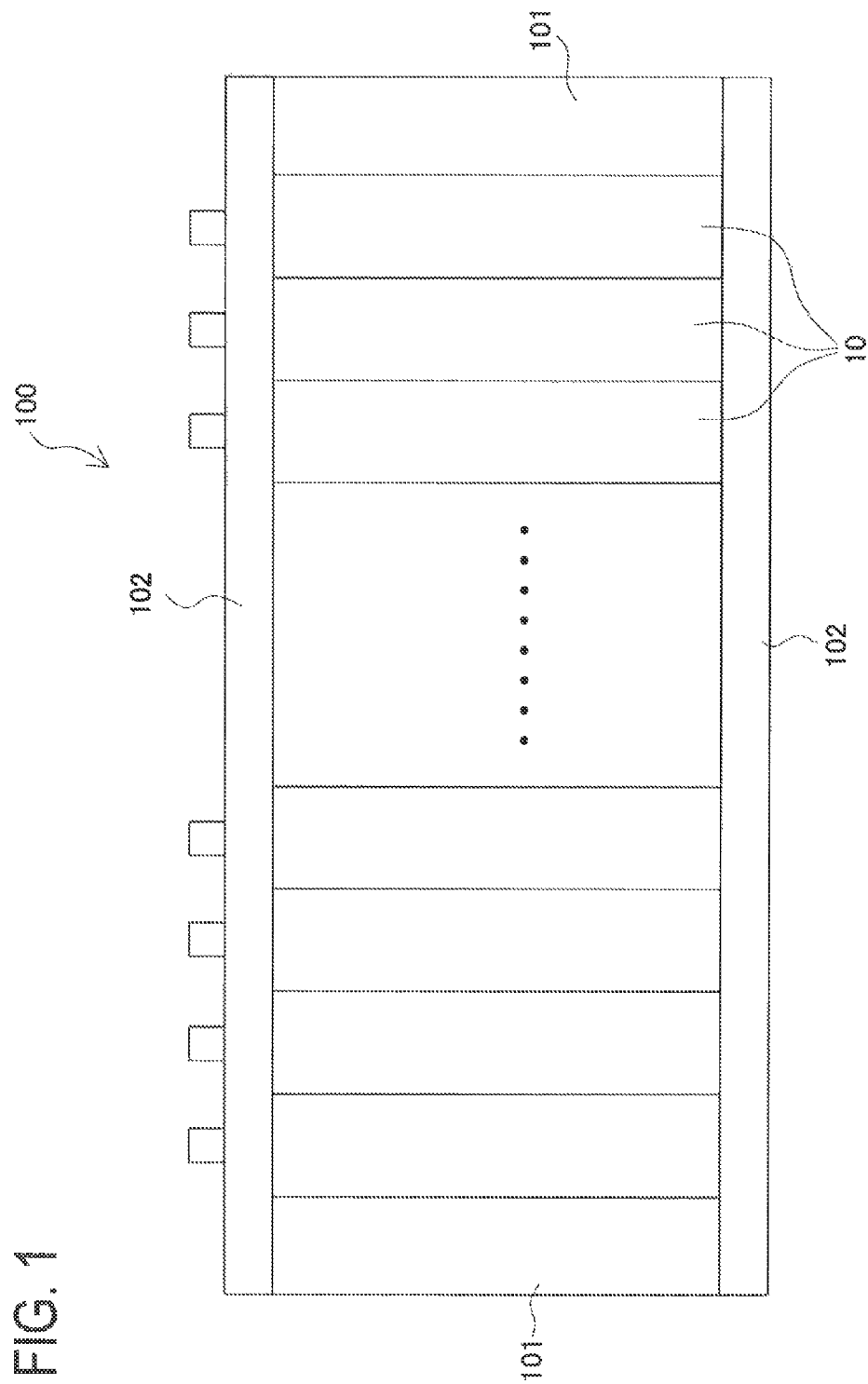
FIG. 1 is an explanatory view showing a cell stack.

A cell 10 in this embodiment is a flat-shaped lithium ion secondary cell and to be incorporated in a cell stack 100 as shown in FIG. 1 in use. This cell stack 100 is configured such that a plurality of cells 10 having the same shape are arranged, end plates 101 are placed on both sides and bound by bands 102. Each of the cells 10 is connected in series with adjacent cells 10 to supply high voltage as a whole. In this figure, a part of side surfaces of each cell 10 shown in FIG. 2 appears.

Figure 2:
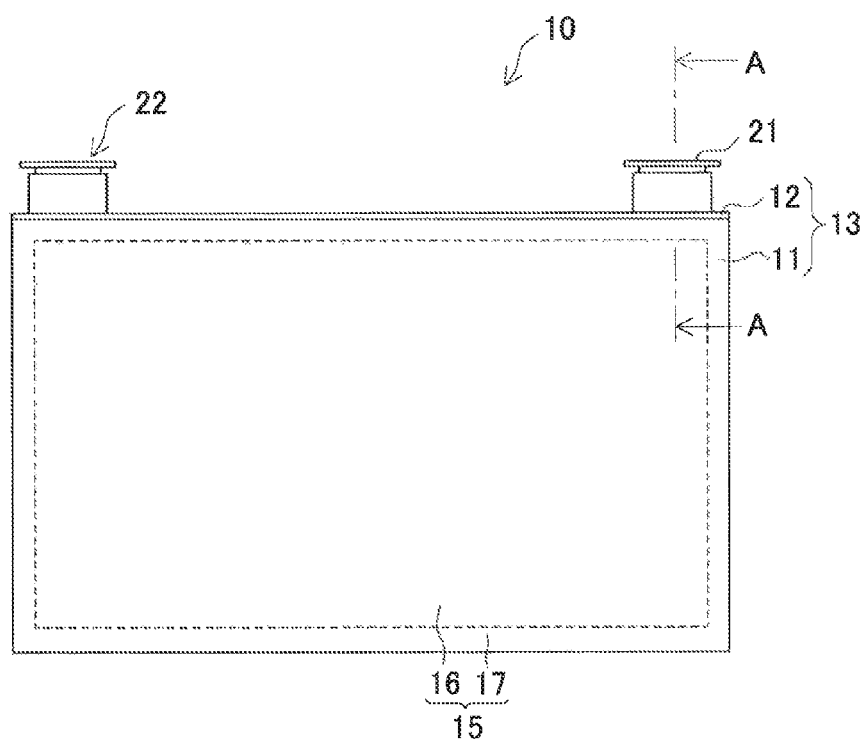
FIG. 2 is a front view showing a cell.

A schematic structure of the cell 10 in the present embodiment will be shown in FIG. 2. The cell 10 in this embodiment includes a cell case 13 formed of a case body 11 and a lid member 12 joined thereto, and a power generating element 15 accommodated in the cell case 13. The cell case 13 is a flat rectangular metal case, which is thin in a depth direction in the figure. The case body 11 has a box-like shape having an opening only at an upper side in the figure. This opening is hermetically closed by the lid member 12. The power generating element 15 of the cell 10 includes an electrode body 16 made of strip-shaped electrode sheets and separators laminated and wound together in a flat form, and non-aqueous electrolyte 17. The cell 10 further includes a positive terminal 21 and a negative terminal 22. These positive terminal 21 and negative terminal 22 respectively protrude from the lid member 12 of the cell case 13 to the outside of the cell 10.

Figure 3:
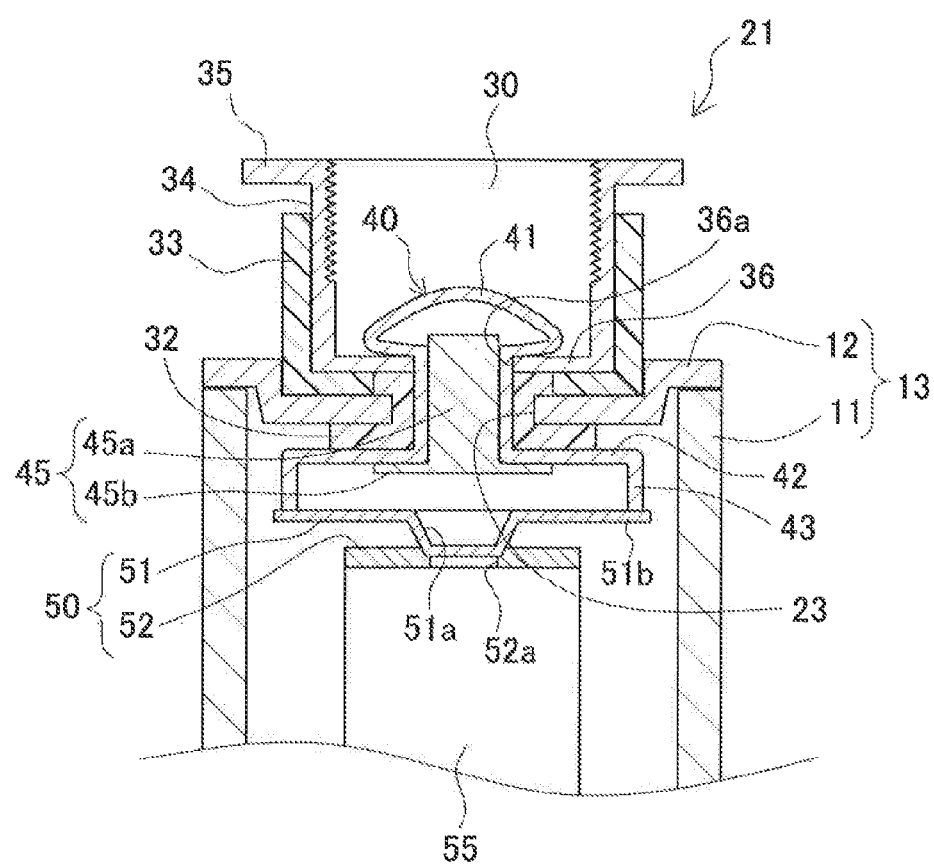
FIG. 3 is a cross sectional view showing a positive terminal of the cell.
Figure 4:
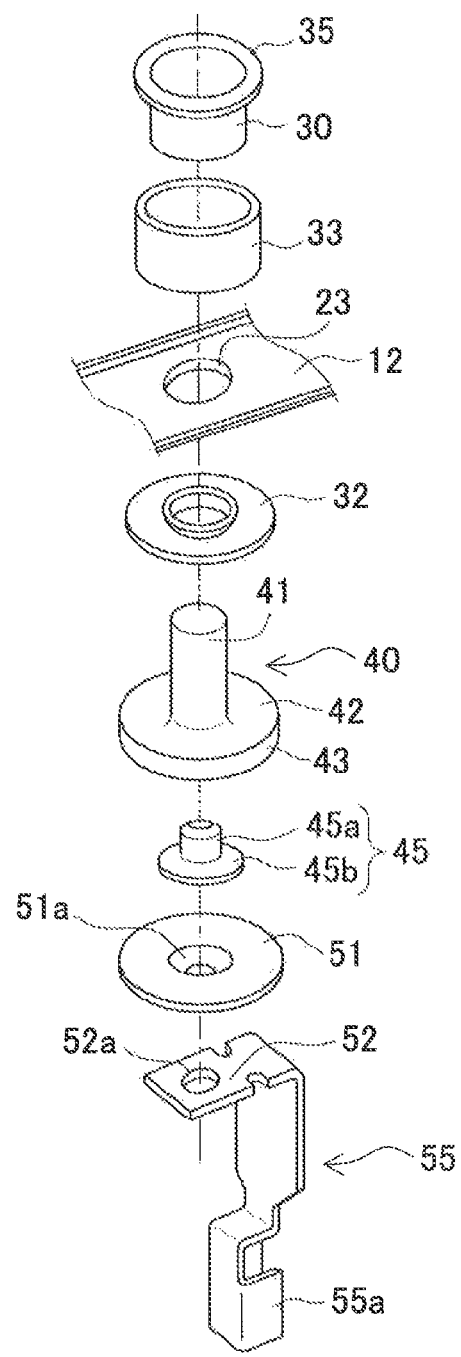
FIG. 4 is an exploded perspective view showing a positive terminal.

The structure of the positive terminal 21 of the cell 10 in the present embodiment will be explained below. FIG. 3 is an enlarged cross sectional view of a part taken along a line A-A in FIG. 2. FIG. 4 is an exploded perspective view of parts or components of the positive terminal 21 before assembling. The lid member 12 is formed with a through hole 23 in a position for the positive terminal 21. The positive terminal 21 includes a pole terminal 30 and a deformed terminal 40. The positive terminal 21 further includes a seal member 32 for insulating between the lid member 12 and the deformed terminal 40, and an insulation member 33 for insulating between the lid member 12 and the pole terminal 30. It is to be noted that FIG. 3 is the same in orientation as FIG. 2 and thus the upper side in FIG. 3 corresponds to the outside of the cell 10 and the lower side in FIG. 3 corresponds to the inside of the cell 10.

The pole terminal 30 is, as shown in FIG. 3, a metal component having a bottom-closed nearly-cylindrical shape including a cylindrical portion 34, a flange 35, and a bottom portion 36. The cylindrical portion 34 is internally formed with female screw-threads 34*a*. The bottom portion 36 of the pole terminal 30 is formed with a through hole 36*a*. The flange 35 is a ring-shaped seat extending radially outward from a distal end (a far end from the bottom portion 36) of the cylindrical portion 34. The flange 35 has a flat upper surface.

The seal member 32 is a nearly ring-shaped member placed along the inner peripheral surface of the through hole 23 of the lid member 12 as shown in FIG. 3. This seal member 32 seals between the deformed terminal 40 and the lid member 12. Accordingly, the inside of the cell case 13 is hermetically sealed. Suitable material for the seal member 32 is rubber, elastic resin, or the like. The insulation member 33 is placed between the lid member 12 and the pole terminal 30 to insulate them from each other. The insulation member 33 is made of insulating resin or the like.

The deformed terminal 40 include a protruding portion 41, a base surface portion 42, and a side surface portion 43, which are continuously formed as shown in FIG. 3. The protruding portion 41 before attachment has a cylindrical shape whose distal end is closed, i.e., a hollow protruding portion as shown in FIG. 4. The base surface portion 42 of the deformed terminal 40 is an annular flat plate portion extending radially outward from a root of the protruding portion 41 as shown in FIG. 3. The side surface portion 43 is a cylindrical portion extending from the outer peripheral edge of the base surface portion 42 in an opposite direction to the protruding portion 41.

In an assembled state shown in FIG. 3, the protruding portion 41 shown in FIG. 4 is inserted through the through hole 23 of the lid member 12 from inside to outside of the cell 10 so that the protruding portion 41 extends into the internal space of the cylindrical portion 34 of the pole terminal 30. The distal end portion of the protruding portion 41, that is, a protruding portion located in the internal space of the cylindrical portion 34 is in a crimped and deformed state. Specifically, the distal end of the protruding portion 41 is squashed to be lower than its original state in a height direction and wider than the original state in a radial direction. The distal end portion of the protruding portion 41 extends radially outward more than the through hole 36*a* of the pole terminal 30.

As shown in FIG. 3, specifically, the protruding portion 41 and the base surface portion 42 of the deformed terminal 40 clamp therebetween the lid member 12 and the pole terminal 30 to fix the pole terminal 30, seal member 32, and insulation member 33 to the lid member 12. The deformed terminal 40 is made of metal and has electrical conductivity. The protruding portion 41 may be formed to be slightly thinner than other portions so as to exhibit flexibility.

Inside the protruding portion 41, a shaft member 45 is placed. This shaft member 45 includes a columnar top portion 45*a* and a flange 45*b* formed at an end of the top portion 45*a* as shown in FIG. 3. At least a distal end of the top portion 45*a* is fitted in the protruding portion 41 of the deformed terminal 40. The flange 45*b* is placed in contact with the base surface portion 42 of the deformed terminal 40 in the space surrounded by the side surface portion 43. The shaft member 45 in the present embodiment is preferably made of metal such as aluminum (aluminium), SUS, and plated steel material.

As shown in FIG. 3, furthermore, a CID 50 is attached to an end of the side surface portion 43 on a far side from the protruding portion 41. The CID 50 in the present embodiment includes an inversion plate 51 and a connecting plate 52. The inversion plate 51 has an inversion portion 51*a* configured to be inverted (counter-bent inside out) and deformed under pressure. It should be noted that this figure illustrates a cell 10 with the CID not worked yet, which is a normal state of the cell 10.

The inversion plate 51 in the present embodiment is made of a nearly circular disc-shaped metal plate. A circumferential edge portion 51*b* of the inversion plate 51 is fixedly welded over its entire circumference to the end of the side surface portion 43 of the deformed terminal 40. This creates the space surrounded and hermetically sealed by the inversion plate 51 and the deformed terminal 40. The internal pressure in this space is thus hardly affected by the internal pressure of the cell 10 and undergoes very little change even during or after use of the cell 10 since the time the cell 10 is produced.

In a center area of the inversion plate 51, as shown in FIG. 3, the inversion portion 51*a* is formed to protrude inward (downward in the figure) in the cell 10 more than the circumferential edge portion 51*b*. The inversion portion 51*a* in the present embodiment is truncated conical. Upon receipt of a force of a certain magnitude or higher from a protruding side, this inversion portion 51*a* is deformed in a stroke to protrude on an opposite side (upward in the figure). This deformation is referred to as "inversion". Once inverted, the inversion plate 51 maintains that shape even after the force is removed, unless opposite force is applied thereto.

The side surface portion 43 of the deformed terminal 40 is formed having a height to an extent that does not disturb inverting of the inversion portion 51*a*. Accordingly, the side surface portion 43 is internally provided with a space having a height allowing inverting of the inversion portion 51*a*. In other words, the inversion portion 51*a* is allowed to be inverted without being pushed back by the base surface portion 42 of the deformed terminal 40 or the shaft member 45.

The connecting plate 52 serves to connect the inversion portion 51*a* with an electrode sheet while the inversion plate 51 is not inverted. The connecting plate 52 in the present embodiment is a metal member formed integrally and continuously to an inner terminal 55 as shown in FIG. 4. A connecting portion 55*a* provided in a lower part of the inner terminal 55 in this figure is to be connected to a positive electrode sheet in the cell 10. The connecting plate 52 is formed at an end of the inner terminal 55 on a far side from the connecting portion 55*a*.

Further, the connecting plate 52 in the present embodiment is formed with a circular hole 52*a* conforming to the outer shape of the inversion portion 51*a* as shown in FIG. 3. The inversion portion 51*a* of the inversion plate 51 is attached to the circular hole 52*a* of the connecting plate 52 so that a bottom surface of the protruding inversion portion 51*a* is fitted in the circular hole 52*a*. An outer surface of the inversion portion 51*a* and the circular hole 52*a* may be slightly fixed by for example spot-like welding or may be simply pressed only into contact with each other.

With the above configurations, the outer peripheral surface of the inversion portion 51*a* of the inversion plate 51 on a protruding side is subjected to pressing force deriving from the internal pressure of the cell 10 through the circular hole 52*a*. On the other hand, the inner peripheral surface of the inversion portion 51*a* on a recessing side is closed by the deformed terminal 40 as above and thus is subjected to original pressure created at the time the cell 10 was produced. When a difference between those pressures becomes a certain level or larger, the inversion portion 51*a* of the inversion plate 51 is inverted, or turned into a counter-bent state. Even if the outer periphery of the inversion portion 51*a* is slightly welded, such weld comes off and the inversion portion 51*a* is inverted. Thus, the inversion plate 51 is separated from the connecting plate 52, establishing a nonconductive state. This motion is regarded as that the CID 50 works. Further, a minimum internal pressure at which the CID 50 works is represents the working pressure of the CID 50.

In the cell 10 in the present embodiment, a positive electrode sheet of the electrode body 16 is connected to the connecting portion 55*a* of the inner terminal 55. In the cell 10 with the CID 50 before working, the inversion portion 51*a* of the inversion plate 51 is in contact with an edge of the circular hole 52*a* of the connecting plate 52. The inversion plate 51 is welded, at the circumferential edge portion 51*b*, to the deformed terminal 40. This deformed terminal 40 is pressed against the pole terminal 30 by the protruding portion 41. In this manner, electrically conduction is established from the positive electrode sheet to the pole terminal 30 via the inner terminal 55, inversion plate 51, and deformed terminal 40. The pole terminal 30 of the cell 10 in the present embodiment functions as an external terminal of a positive electrode.

When the internal pressure of the cell 10 rises due to some causes and exceeds the working pressure of the CID 50, the inversion portion 51*a* of the inversion plate 51 is inverted. This interrupts the conduction between the inversion plate 51 and the connecting plate 52, that is, interrupts the electric current between the positive electrode sheet and the pole terminal 30. The cell 10 in this state can no longer be charged or discharged through the pole terminal 30. It is to be noted that the negative terminal 22 is provided with no CID. A pole terminal of the negative terminal 22 continuously functions as an external terminal of a negative electrode.

Figure 5:
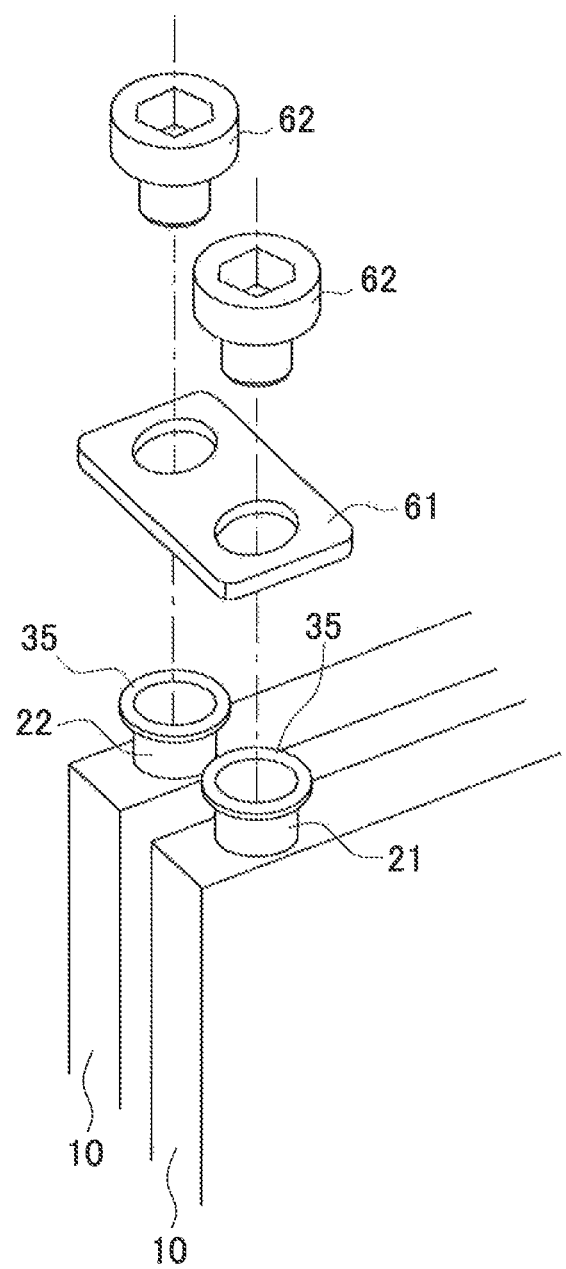
FIG. 5 is an exploded perspective view showing a part to which a bus bar is attached.

In the cell stack 100 in the present embodiment, as shown in FIG. 5, a plurality of the cells 10 are arranged and connected by a bus bar 61. Specifically, the positive terminal 21 of a first cell 10 and the negative terminal 22 of a second cell 10 are arranged adjacently, and the bus bar 61 is placed in contact with the flanges 35 of the pole terminals 30 of both the terminals 21 and 22.

Figure 6:
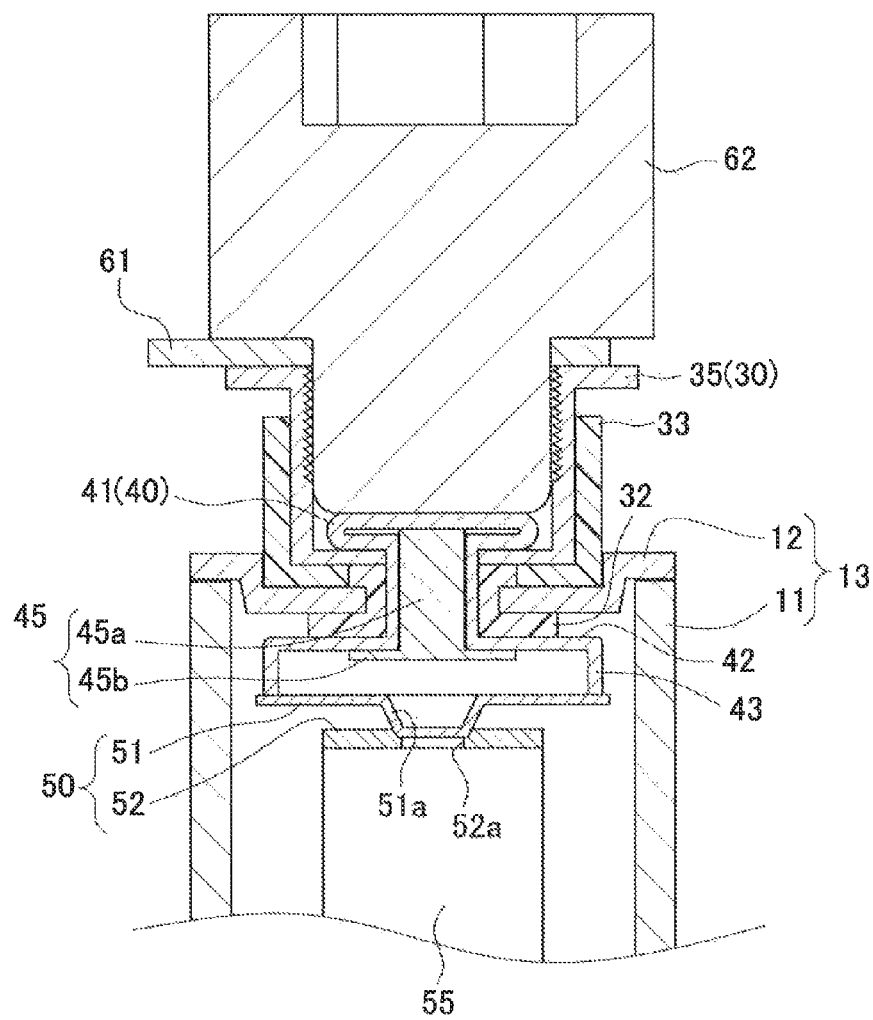
FIG. 6 is a cross sectional view showing a positive terminal of a cell before action of a CID.

FIG. 6 is a cross sectional view of the positive terminal 21 of the cell stack 100. In the cells 10 of the cell stack 100, screws 62 are tightened one in each of the cylindrical portions 34 of the pole terminals 30 by passing through holes of the bus bar 61. Accordingly, the positive electrode sheet of each cell 10 is connected to the bus bar 61 and the screw 62 through the pole terminal 30 and further connected to a negative terminal 22 of another cell 10 through the bus bar 61. The negative terminal 22 of this cell 10 is also connected to a positive terminal 21 of another cell through another bus bar. In the cell stack 100, in this manner, the plurality of cells 10 are connected in series to one another.

If the internal pressure of one cell 10 rises to a certain degree or higher due to some causes, the CID 50 works. In the cell 10 in the present embodiment, the internal pressure during normal use (SOC 0 to 100%) is 0.15 MPa or less. The working pressure of the CID 50 in the cell 10 in this embodiment is set in a range of 0.35 to 0.75 MPa. This corresponds to a range of SOC 130 to 160%. The SOC of each cell 10 in the present embodiment is defined so that SOC 0% corresponds to a voltage of 3V and SOC 100% corresponds to a voltage of 4.1 V. The internal pressure of the cell 10 at which the safety valve is caused to open in the present embodiment is set to about 1.0 MPa.

Figure 7:
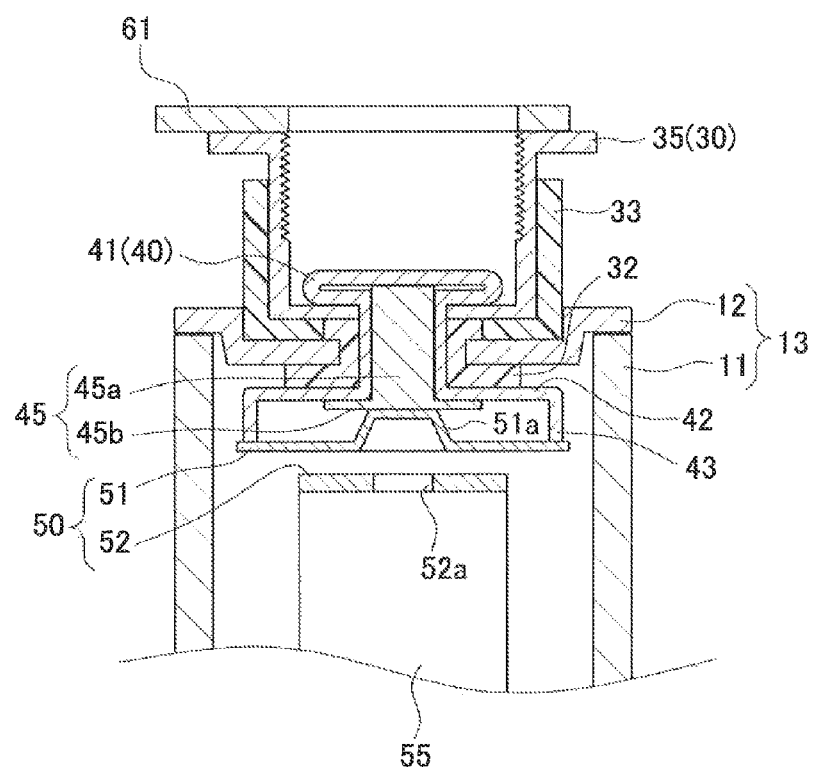
FIG. 7 is a cross sectional view showing the positive terminal of the cell after action of the CID.

Upon working of the CID 50 in the positive terminal 21 of the cell 10, the inversion portion 51a of the inversion plate 51 is inverted as shown in FIG. 7, thereby interrupting connection between the inversion plate 51 and the connecting plate 52. This interrupts a current path between the inner terminal 55 and the bus bar 61. Thus, this cell stack 100 is riot charged any more. This state can be detected by a controller or the like that controls the cell stack 100. Since the controller also usually monitors the condition of each cell 10, it is also possible to detect in which of the cells 10 in the cell stack 100 the CID 50 worked.

When the CID or CIDs 50 in one or more of the cells 10 in the cell stack 100 worked, the cell stack 100 can no longer be used. In particular, the cell 10 in which the CID 50 worked but the safety valve has not opened yet is in an overcharge condition and keeps the high internal pressure. It is therefore undesirable to strongly vibrate or forcedly disassemble the cell stack 100 in such a state.

On the other hand, the present embodiment provides a process method capable of discharging the cell 10 having the worked CID 50 without disassembling the cell stack 100. This process is performed after the cell stack 100 including the cell 10 having the worked CID 50 is dismounted from a vehicle or the like.

A worker or operator who handles this process first determines which cell 10 of the cell stack 100 includes the CID 50 worked. This determination can be usually performed based on a monitoring result of the controller. As an alternative, the determination can be made by checking the outer appearance of each cell 10 to find a cell case 13 expanded and a safety valve unopened. This process may apply to the cell(s) 10 having the CID(s) 50 not worked. In the following explanation, the cell 10 with the worked CID 50 is referred to as a worked cell 10.

The worker unscrews the screw 62 of the positive terminal 21 of the worked cell 10. This screw 62 is exposed outside of the binding band 102 of the cell stack 100 and thus can be easily removed. This state of the positive terminal 21 is illustrated in FIG. 7. Since the inside of the worked cell 10 in this state is also kept sealed, gas is not allowed to blow out of the cell 10. Even though not illustrated in this figure, the bus bar 61 is connected to another cell 10 placed adjacent to the worked cell 10.

Figure 8:
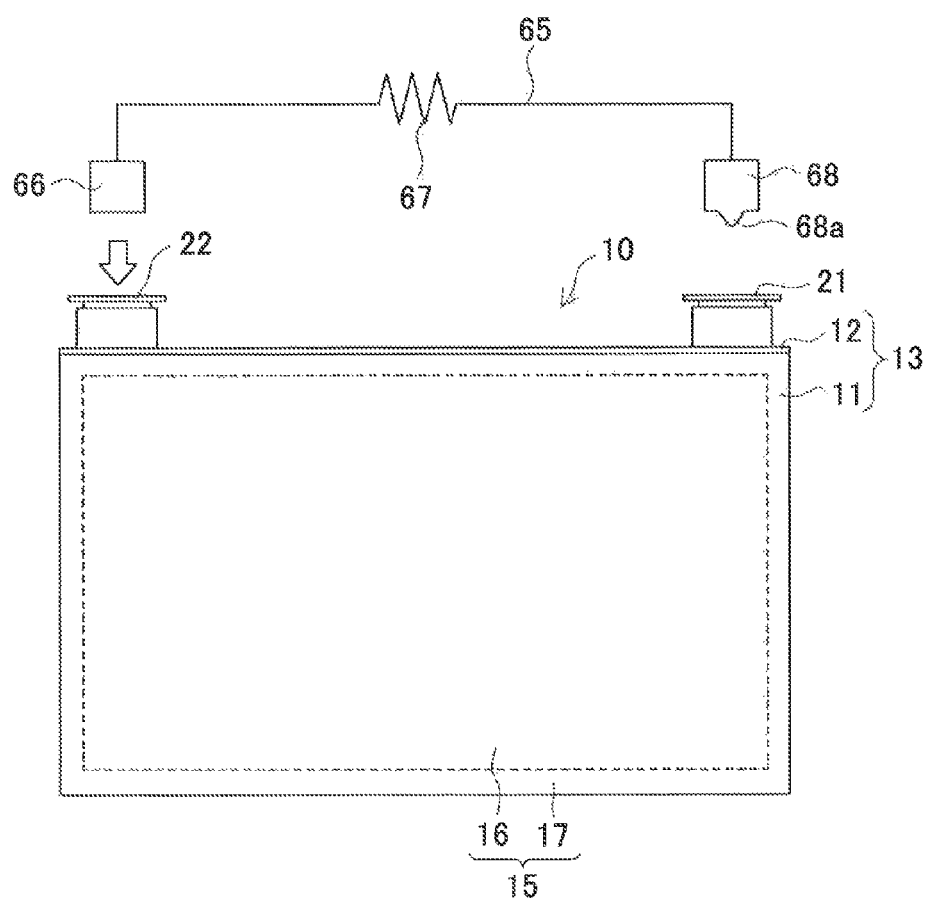
FIG. 8 is a front view showing a state where a resistor element adaptor is attached to the cell.

Successively, as shown in FIG. 8, a negative-electrode-side connecting part 66 of a resistor element adaptor 65 is attached to the negative terminal 22 of the worked cell 10. The resistor element adaptor 65 includes the negative-electrode-side connecting part 66, a resistor 67, and a positive-electrode-side connecting part 68. The adaptor 65 is an adaptor which will be connected between a positive electrode and a negative electrode of the worked cell 10 to discharge the worked cell 10 through an adequate resistor. The negative-electrode-side connecting part 66 may be fitted in the corresponding pole terminal 30 after the screw 62 is removed therefrom or may be connected to the screw 62 without removing this screw 62. As the resistor 67, a resistor of about 0.5 to 1.0Ω is suitable for the cell 10 in the present embodiment.

Figure 9:
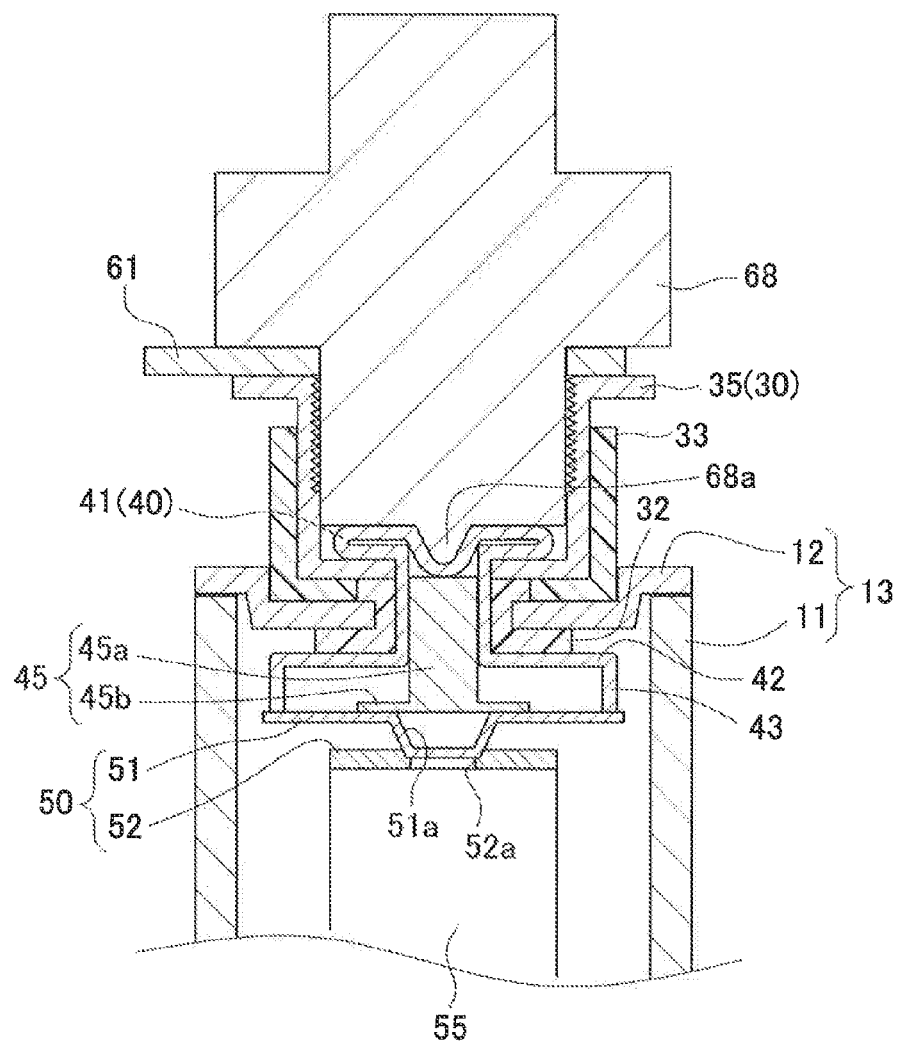
FIG. 9 is a cross sectional view showing a positive terminal during discharge after action of the CID.

The worker then screws the positive-electrode-side connecting part 68 of the resistor element adaptor 65 into the pole terminal 30 of the positive terminal 21 of the worked cell 10. The positive-electrode-side connecting part 68 has a protrusion 68a at the center of a lower end face as shown in FIG. 9. When the positive-electrode-side connecting part 68 is screwed in, the protrusion 68a is brought into contact with a center area of the protruding portion 41 of the deformed terminal 40 inside the positive terminal 21. The worker further screws the positive-electrode-side connecting part 68 more deeply against the internal pressure of the activated cell 10.

Accordingly, the protruding portion 41 is deformed to be recessed toward the inside of the worked cell 10, and this recessed portion presses down the top portion 45a of the shaft member 45. Herein, the protruding portion 41 of the deformed terminal 40 is a relatively soft portion to be crimped, so that this protruding portion 41 is easily deformed. The shaft member 45 is placed with its top portion 45a simply inserted in the protruding portion 41 and thus is movable. Therefore, an end of the shaft member 45 located in the inside of the cell is pressed against the inverted inversion portion 51a of the inversion plate 51 and pushes back the inversion portion 51a toward the inside of the cell 10. The inversion portion 51a of the inversion plate 51 is then inverted to protrude in the opposite direction to the action when it worked, returning to an original position as shown in FIG. 9.

This establishes re-conduction between the inversion plate 51 and the connecting plate 52. The positive-electrode-side connecting part 68 of the attached resistor element adaptor 65 is connected to the deformed terminal 40 or the pole terminal 30. The worked cell 10 therefore enters a state where the resistor element adaptor 65 is connected between both the electrode terminals. This cell 10 is thus discharged through the resistor 67, eliminating the overcharged state. Thereafter, the cell stack 100 can be relatively safely disassembled.

The shaft member 45 in the present embodiment including the flange 45b provides a wide area to press against the inversion portion 51a. Even if the inversion portion 51a is transformed into whatever shape by inversion, it is likely to be pushed back. The flange 45h prevents the shaft member 45 from protruding out of the cell 10. Since the shaft member 45 in the present embodiment is electrically conductive, the shaft member 45 allows re-conduction even if the inversion portion 51a is broken.

The above process enables disposal or recycle of the worked cell 10. When the worked cell 10 is sufficiently discharged, the worker removes the resistance element adaptor 65. This adapter 65 is reusable. If the resistance value of the resistor 67 is excessively high, it is not desirable because it takes long to discharge. To the contrary, if the resistance value of the resistor 67 is excessively low, it is not desirable because it causes a large current value right after re-conduction.

According to the cell 10 in the present embodiment, as explained above in detail, the shaft member 45 is placed in the protruding portion 41 of the deformed terminal 40, so that pressing down the shaft member 45 in the cell 10 with the CID 50 worked can invert the inversion portion 51a of the inversion plate 50 again. By use of the resistor element adaptor 65, particularly, the positive-electrode-side connecting part 68 can press down the shaft member 45 through the deformed terminal 40. Furthermore, when the resistor element adaptor 65 is connected to the positive terminal 21 and the negative terminal 22, the cell 10 can be discharged through the resistor 67. Consequently, even after the CID 50 worked, the relevant cell 10 can be safely and easily disposed.

The above embodiment is a mere example and does not give any limitation to the present invention. Thus, the present invention may be embodied in other specific forms without departing from the essential characteristics thereof.

For instance, the shaft member may be not only a member made of metal but also any member made of insulating resin having durability and heat resistance. Even if the shaft member has an insulation property, a current path is ensured as long as the inversion portion is inverted again. The flange of the shaft member is not indispensable and the shaft member may be made in a simple rod shape. As another alternative, the shaft member may be designed so that the end on the side which will contact with the inversion portion has a shape conforming to the shape of the inversion portion.

Figure 10:
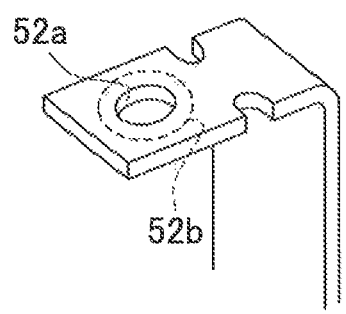
FIG. 10 is an explanatory view showing another example of a connecting plate.

Moreover, for example, the structure of the CID is not limited to the above and may be applied to any types generally used. When the CID works, for instance, a part of the connecting plate may be broken instead of coming off a contact area between the inversion portion and the connecting plate. In this case, one example of the connecting plate is shown in FIG. 10, in which a fragile portion 52b that is easily broken is formed around the circular hole 52a. In this example, the fragile portion 52b is broken in association with inversion of the inversion portion 51a when the CID works. Accordingly, a portion on the inner circumferential side of the broken area is moved together with the inversion portion 51a and separated from a remaining portion of the connecting plate. In this case, it is preferable to firmly fix the inversion portion 51a with the circular hole 52a by welding, thermal adhering, and so on.

Furthermore, the connecting plate may be a plate formed with no hole. In this case, a protruding top of the inversion portion has only to be placed in contact with the surface of the connecting plate. However, a plate formed with a hole is more preferable because the internal pressure of the cell case is applied to the inversion plate through the hole. As another alternative, for example, the connecting plate may be formed continuously to the connecting portion 55a of the inner terminal 55 through a fragile portion. In this case, the inversion portion and the connecting plate are desired to be firmly fixed to each other.

In FIG. 6, the screw 62 is brought into contact with the protruding portion 41, thereby flattening the distal end of the protruding portion 41. However, the screw 62 and the protruding portion 41 do not necessarily need to contact with each other. In FIG. 7, the inverted inversion portion appears to contact with the shaft member, but a gap may also be exist between them. In FIG. 9, the shaft member appears to contact with a portion surrounding the inversion portion of the inversion plate, but the shaft member is not necessarily pressed down to this position. The shaft member has only to be pressed down to a position that can cause re-inversion of the inversion portion. Further, the shape of the inversion portion is not limited to a truncated conical shape and may be a semispherical shape, for example.

Although the embodiment shows that the CID is provided in the positive terminal, the CID may be provided in the negative terminal instead. From the viewpoint of easiness in machining, however, a positive terminal made of aluminum (aluminium) is more suitable than a negative terminal made of copper. The CID may be provided in both a positive terminal and a negative terminal, but such a configuration is not so beneficial. The resistance values of the resistance element adaptor, the working pressure of the CID, and others are mere examples and they are not limited to the above.

REFERENCE SIGNS LIST

10 Cell
13 Cell case
15 Power generating element
30 Pole terminal
34 Cylindrical portion
36 Bottom portion
36a Through hole
40 Deformed terminal
41 Protrusion
42 Base surface portion
43 Side surface portion
45 Shaft member
45a Top portion
45b Flange
51 Inversion plate
52a Circular hole
52b Fragile portion
55 Inner terminal

The invention claimed is:
1. A sealed cell including:
a cell case formed with a through hole;
a power generating element accommodated in the cell case;
an inner terminal placed in the cell case and connected to the power generating element;
a pole terminal including a cylindrical portion and a bottom portion provided at one end of the cylindrical portion, the bottom portion being formed with a through hole, the pole terminal being placed on outside of the cell case so that the bottom portion faces the cell case and the through hole of the bottom portion is positioned over the through hole of the cell case;
a deformed terminal including a base surface portion placed in the cell case, and a hollow protruding portion extending from inside of the cell case into internal space of the cylindrical portion through the through hole of the cell case and the through hole of the pole terminal, and extending radially more outward than the through holes in the internal space so that the base surface portion and the protruding portion fix the pole terminal to the cell case;
an inversion plate attached to the base surface portion of the deformed terminal so that at least a part of the inversion plate contacts with the inner terminal in a normal state and, when internal pressure of the cell case rises beyond working pressure, at least the part of the inversion plate is deformed to invert away from the inner terminal to interrupt conduction between the inner terminal and the deformed terminal; and a shaft member having a top portion at least a part of which is placed in the protruding portion so that, after the inversion plate is inverted, the top portion is pressed from outside and moved within the protruding portion to press the inversion plate inward to allow re-conduction between the inner terminal and the deformed terminal, wherein the deformed terminal and the inversion plate are arranged to provide therebetween hermetically sealed space separately from the internal space of the cell case.

2. The sealed cell according to claim 1, wherein the shaft member is made of electrically conductive material.

3. The sealed cell according to claim 1, wherein the shaft member is formed with a flange extending radially from an end of the shaft member on an internal side of the cell case.

4. The sealed cell according to claim 1, wherein the base surface portion of the deformed terminal includes a side surface portion protruding toward the internal side of the cell case, and the inversion plate is fixed over entire circumference to an end of the side surface portion.

5. The sealed cell according to claim 1, wherein the inner terminal has a through hole, and before inversion of the inversion plate, at least a part of the inversion plate is placed to block the through hole.

6. The sealed cell according to claim 1, wherein a contact portion of the inversion plate and a contact portion of the inner terminal are fixed to each other, and a part of the inner terminal is formed with a fragile portion that is broken when the inversion plate is inverted to separate the contact portion of the inner terminal contacting with the inversion plate from a remaining portion.

7. The sealed cell according to claim 2, wherein the shaft member is formed with a flange extending radially from an end of the shaft member on an internal side of the cell case.

8. The sealed cell according to claim 2, wherein the base surface portion of the deformed terminal includes a side surface portion protruding toward the internal side of the cell case, and the inversion plate is fixed over entire circumference to an end of the side surface portion.

9. The sealed cell according to claim 3, wherein the base surface portion of the deformed terminal includes a side surface portion protruding toward the internal side of the cell case, and the inversion plate is fixed over entire circumference to an end of the side surface portion.

10. The sealed cell according to claim 7, wherein the base surface portion of the deformed terminal includes a side surface portion protruding toward the internal side of the cell case, and the inversion plate is fixed over entire circumference to an end of the side surface portion.

11. The sealed cell according to claim 2, wherein the inner terminal has a through hole, and before inversion of the inversion plate, at least a part of the inversion plate is placed to block the through hole.

12. The sealed cell according to claim 3, wherein the inner terminal has a through hole, and before inversion of the inversion plate, at least a part of the inversion plate is placed to block the through hole.

13. The sealed cell according to claim 4, wherein the inner terminal has a through hole, and before inversion of the inversion plate, at least a part of the inversion plate is placed to block the through hole.

14. The sealed cell according to claim 7, wherein the inner terminal has a through hole, and before inversion of the inversion plate, a least a part of the inversion plate is placed to block the through hole.

15. The sealed cell according to claim 8, wherein the inner terminal has a through hole, and before inversion of the inversion plate, a least a part of the inversion plate is placed to block the through hole.

16. The sealed cell according to claim 9, wherein the inner terminal has a through hole, and before inversion of the inversion plate, at least a part of the inversion plate is placed to block the through hole.

17. The sealed cell according to claim 10, wherein the inner terminal has a through hole, and before inversion of the inversion plate, at least a part of the inversion plate is placed to block the through hole.

18. The sealed cell according to claim 2, wherein a contact portion of the inversion plate and a contact portion of the inner terminal are fixed to each other, and a part of the inner terminal is formed with a fragile portion that is broken when the inversion plate is inverted to separate the contact portion of the inner terminal contacting with the inversion plate from a remaining portion.

19. The sealed cell according to claim 3, wherein a contact portion of the inversion plate and a contact portion of the inner terminal are fixed to each other, and a part of the inner terminal is formed with a fragile portion that is broken when the inversion plate is inverted to separate the contact portion of the inner terminal contacting with the inversion plate from a remaining portion.

20. The sealed cell according to claim 4, wherein a contact portion of the inversion plate and a contact portion of the inner terminal are fixed to each other, and a part of the inner terminal is formed with a fragile portion that is broken when the inversion plate is inverted to separate the contact portion of the inner terminal contacting with the inversion plate from a remaining portion.

* * * * *